(12) United States Patent
Yang et al.

(10) Patent No.: US 11,622,430 B2
(45) Date of Patent: Apr. 4, 2023

(54) CONTROL CIRCUIT, CONTROL METHOD AND POWER CONVERTER

(71) Applicant: Silergy Semiconductor Technology (Hangzhou) LTD, Hangzhou (CN)

(72) Inventors: Yuanyu Yang, Hangzhou (CN); Bo Cai, Hangzhou (CN); Jian Li, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 17/734,369

(22) Filed: May 2, 2022

(65) Prior Publication Data

US 2022/0264722 A1    Aug. 18, 2022

Related U.S. Application Data

(63) Continuation of application No. 17/035,972, filed on Sep. 29, 2020, now Pat. No. 11,350,502.

(30) Foreign Application Priority Data

Sep. 30, 2019    (CN) .......................... 201910937813.6

(51) Int. Cl.
*H05B 45/385*        (2020.01)
*H02M 3/335*         (2006.01)

(52) U.S. Cl.
CPC ...... *H05B 45/385* (2020.01); *H02M 3/33523* (2013.01); *H02M 3/3353* (2013.01); *H02M 3/33507* (2013.01)

(58) Field of Classification Search
CPC .......... H02M 3/3353; H02M 3/33507; H02M 3/33523; H05B 45/385
See application file for complete search history.

(56) References Cited

U.S. PATENT DOCUMENTS

| | | | |
|---|---|---|---|
| 4,035,703 | A | 7/1977 | Hablutzel |
| 5,892,671 | A | 4/1999 | François et al. |
| 8,115,402 | B2 | 2/2012 | Kuang et al. |
| 8,922,174 | B2 | 12/2014 | Xu |
| 9,054,592 | B2 | 6/2015 | Yao et al. |
| 9,054,597 | B2 | 6/2015 | Zhao et al. |
| 9,225,168 | B2 | 12/2015 | Ogawa et al. |
| 9,287,793 | B2 | 3/2016 | Zhang et al. |
| 9,391,511 | B2 | 7/2016 | Yu et al. |

(Continued)

FOREIGN PATENT DOCUMENTS

| | | |
|---|---|---|
| CN | 202282885 U | 6/2012 |
| CN | 103281823 B | 4/2016 |

(Continued)

*Primary Examiner* — Jue Zhang

(57) ABSTRACT

A control circuit for controlling a power converter can include: a constant voltage output module, a constant current output module, and a power stage circuit; and where the control circuit is configured to select one of a first feedback signal representative of output information of the constant current output module, and a second feedback signal representative of output information of the constant voltage output module as a feedback input signal based on operation states of the constant current output module and the constant voltage output module, in order to control a switching state of a power switch of the power stage circuit.

20 Claims, 10 Drawing Sheets

(56) References Cited

U.S. PATENT DOCUMENTS

| | | |
|---|---|---|
| 9,559,591 B2 | 1/2017 | Hang et al. |
| 9,577,533 B2 | 2/2017 | Yu et al. |
| 9,755,521 B2 | 9/2017 | Cai et al. |
| 9,991,811 B1 | 6/2018 | Song et al. |
| 10,110,131 B2 | 10/2018 | Yu et al. |
| 10,122,257 B2 | 11/2018 | Huang et al. |
| 2004/0004470 A1 | 1/2004 | Yoshida et al. |
| 2010/0128499 A1 | 5/2010 | Mansfield et al. |
| 2010/0327838 A1 | 12/2010 | Melanson |
| 2011/0084677 A1 | 4/2011 | Shi et al. |
| 2011/0199023 A1 | 8/2011 | Zimmermann et al. |
| 2012/0026766 A1 | 2/2012 | Adragna |
| 2012/0086422 A1 | 4/2012 | Ito et al. |
| 2012/0112795 A1 | 5/2012 | Wang et al. |
| 2012/0139514 A1 | 6/2012 | Paatero |
| 2013/0241512 A1 | 9/2013 | Yamada |
| 2014/0112028 A1 | 4/2014 | Fahlenkamp et al. |
| 2015/0311807 A1 | 10/2015 | Oswald et al. |
| 2016/0109488 A1 | 4/2016 | Dearborn et al. |
| 2016/0197545 A1 | 7/2016 | Nemoto et al. |
| 2016/0294292 A1 | 10/2016 | Huang et al. |
| 2016/0301407 A1 | 10/2016 | Chen et al. |
| 2017/0027030 A1* | 1/2017 | Wang ..................... H05B 45/20 |
| 2017/0213677 A1 | 7/2017 | Yu et al. |
| 2017/0231041 A1* | 8/2017 | Yang ..................... H05B 45/10 |
| 2017/0251535 A1* | 8/2017 | Huang .............. H02M 3/33507 |

FOREIGN PATENT DOCUMENTS

| | | | |
|---|---|---|---|
| WO | 2020014919 A1 | 1/2020 | |
| WO | WO-2020014919 A1 * | 1/2020 | ........ H02M 3/33523 |

\* cited by examiner

US 11,622,430 B2

CONTROL CIRCUIT, CONTROL METHOD AND POWER CONVERTER

RELATED APPLICATIONS

This application is a continuation of the following application, U.S. patent application Ser. No. 17/035,972, filed on Sep. 29, 2020, and which is hereby incorporated by reference as if it is set forth in full in this specification, and which also claims the benefit of Chinese Patent Application No. 201910937813.6, filed on Sep. 30, 2019, which is incorporated herein by reference in its entirety.

FIELD OF THE INVENTION

The present invention generally relates to the field of power electronics, and more particularly to control circuits, control methods, and associated power converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

The power requirements for various types of load devices can vary widely at many applications. For example, most load devices require a constant voltage. However, there are also load devices that require a constant current. To facilitate design, the power converter can provide dual output that include a constant voltage output and a constant current output.

Figure 1:
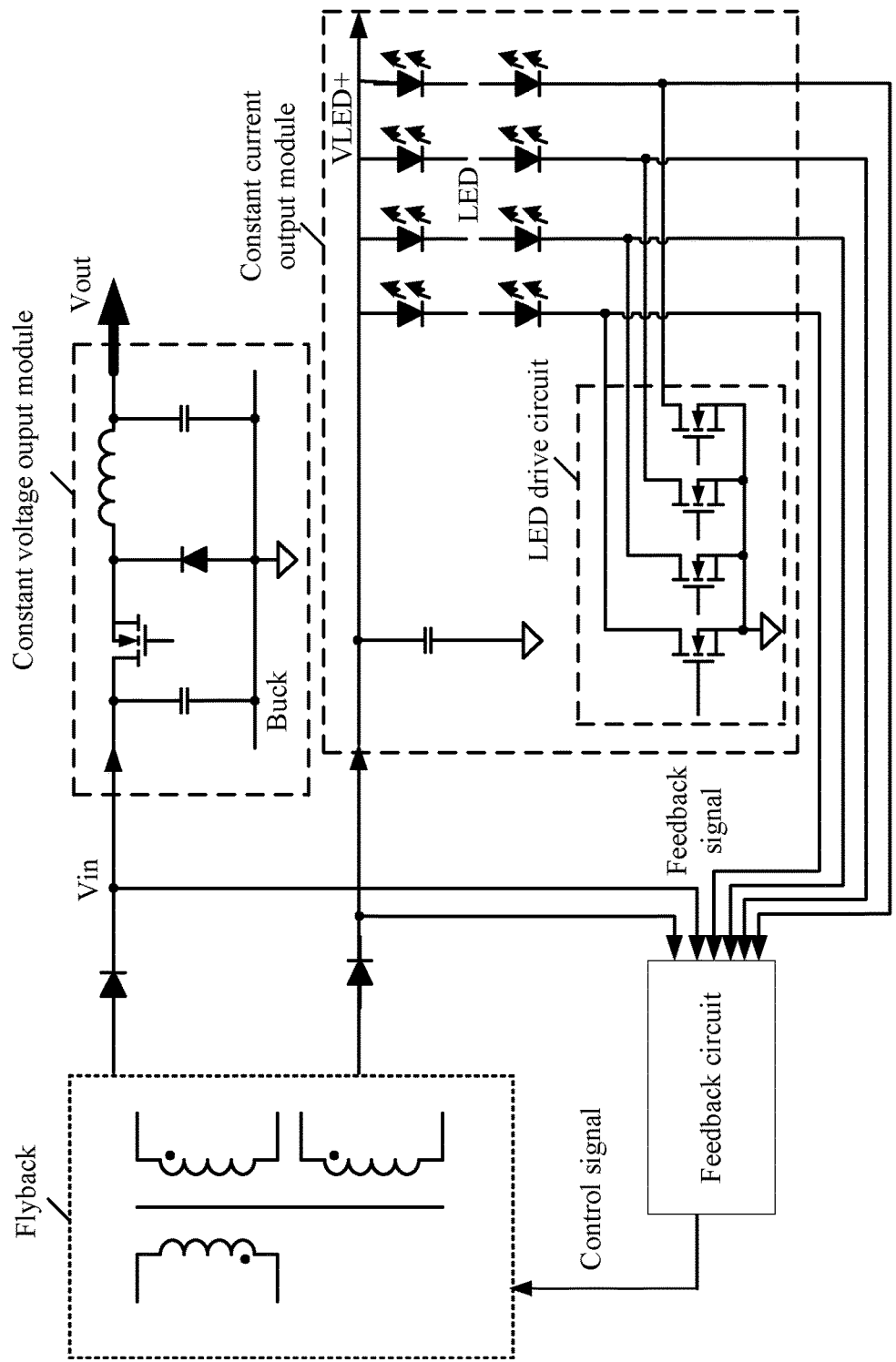
FIG. 1 is a schematic block diagram of an example power converter with a constant current output module and a constant voltage output module.

Referring now to FIG. 1, shown is a schematic block diagram of an example power converter with a constant current output module and a constant voltage output module. As used herein, a "module" can be circuitry, such as including hardware devices, elements, structures, components, and/or circuits. This example power converter can be configured as a flyback converter that can provide energy for the constant current output module and the constant voltage output module. The constant current output module can include an LED drive circuit connected in series with LEDs. The LED drive circuit can control the current flowing through the LED to be a constant current. The constant voltage output module can generate a constant voltage. A feedback circuit of the flyback converter can receive feedback signals from the secondary side of the flyback converter, and may generate a control signal at the primary side of the flyback converter to control the switching state of a power switch of a power stage circuit in the flyback converter, in order to regulate the output signals of the constant current output module and the constant voltage output module.

Figure 2:
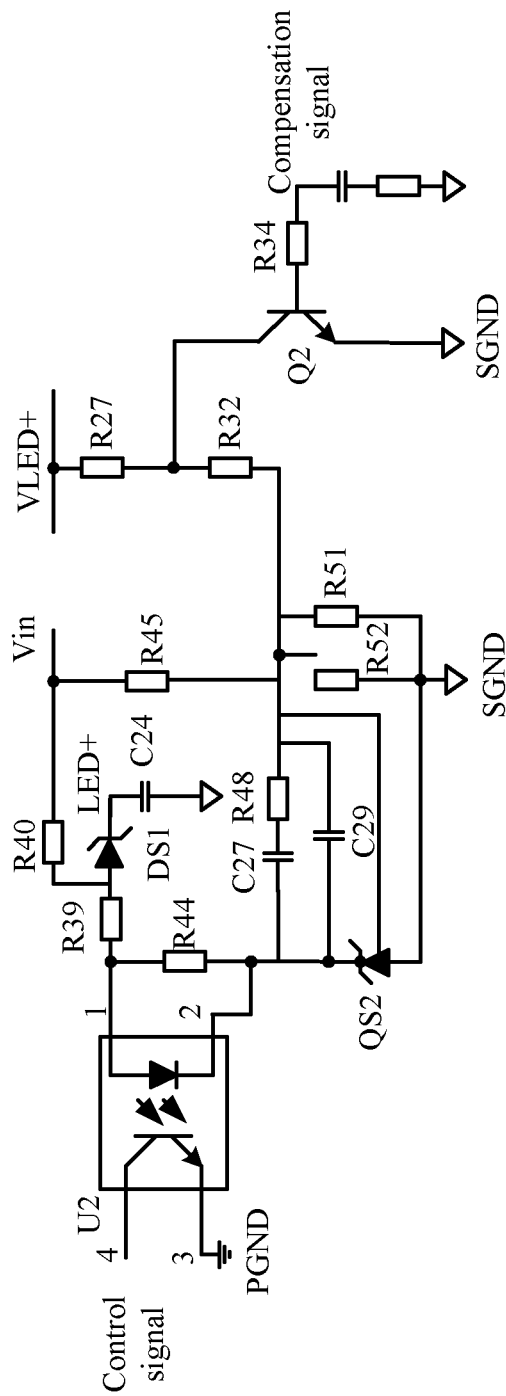
FIG. 2 is a schematic block diagram of an example feedback circuit.

Referring now to FIG. 2, shown is a schematic block diagram of an example feedback circuit. This example feedback circuit can receive feedback signals that are provided by the constant current output module and the constant voltage output module. For example, the feedback circuit can receive the feedback signals that can include input signal Vin of the constant voltage output module, input signal VLED+ of the constant voltage output module, voltages at cathodes of the LED strings and a compensation signal generate by a compensation circuit, and can generate the control signal based on the feedback signals to control the switching state of the power switch.

Figure 3:
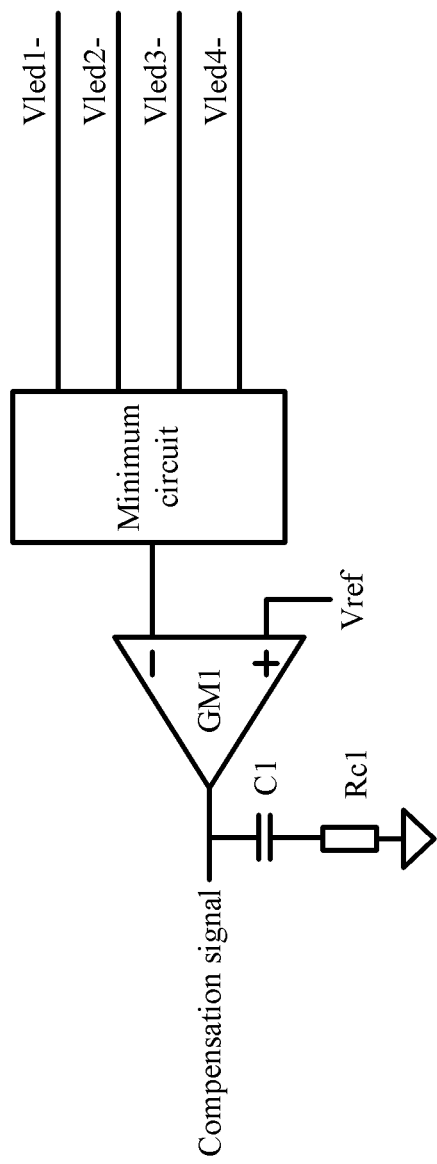
FIG. 3 is a schematic block diagram of an example compensation circuit.

Referring now to FIG. 3, shown is a schematic block diagram of an example compensation circuit. The compensation circuit can include a minimum circuit and a transconductance operational amplifier. A first input terminal of the transconductance operational amplifier can receive a minimum value of the voltages at cathodes of the LED strings (e.g., voltages Vled1-, Vled2-, Vled3-, Vled4-), and a second input terminal of the transconductance operational amplifier can receive reference voltage Vref. An output terminal of the transconductance operational amplifier can connect to a RC circuit for generating the compensation signal. The feedback circuit can include multiple RC circuits, which may cause the feedback loop circuit to form multiple poles, resulting in poor system stability. Further, the feedback circuit can be more complicated with multiple components, and the cost of the system is high. The feedback circuit may employ the input signal of the constant voltage output module as a main feedback signal, and employ the voltages at cathodes of the LED strings and the compensation signal as auxiliary feedback signals. This can cause the limited ability of voltages at cathodes of the LED strings and the compensation signal to control the flyback converter. In this way, when the LED is light, the voltages at the cathodes of all LED strings are significantly higher than reference voltage Vref, possibly resulting in greater energy loss.

In one embodiment, a control circuit for controlling a power converter can include: (i) a constant voltage output module, a constant current output module, and a power stage circuit; and (ii) where the control circuit is configured to select one of a first feedback signal representative of output information of the constant current output module, and a second feedback signal representative of output information of the constant voltage output module as a feedback input signal based on operation states of the constant current output module and the constant voltage output module, in order to control a switching state of a power switch of the power stage circuit.

Figure 4:
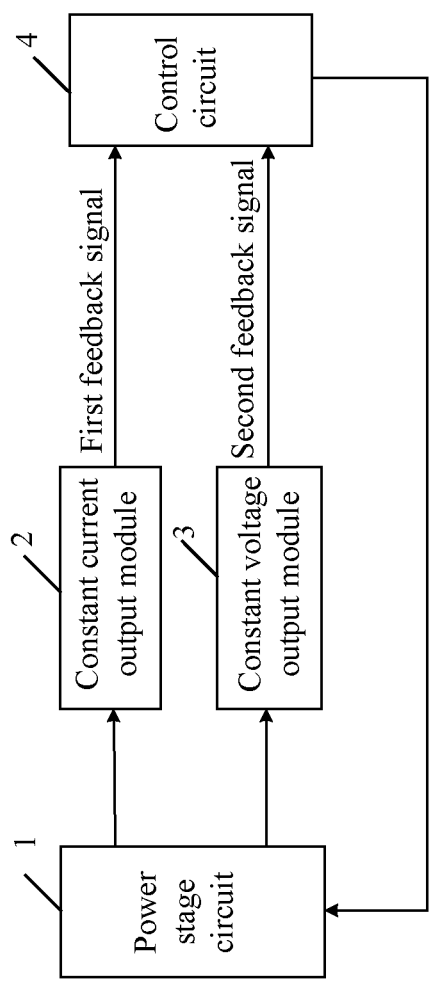
FIG. 4 is a schematic block diagram of a first example power converter with a control circuit, in accordance with embodiments of the present invention.

Referring now to FIG. 4, shown is a schematic block diagram of a first example power converter with a control circuit, in accordance with embodiments of the present invention. This example power converter can include power stage circuit 1, constant current output module 2, constant voltage output module 3, and control circuit 4. Power stage circuit 1 can provide energy to constant current output module 2 and constant voltage output module 3. Control circuit 4 can select one of a first feedback signal representative of the output information of constant current output module 2 and a second feedback signal representative of the output information of constant voltage output module 3 as a feedback input signal, based on the operation states of constant current output module 2 and constant voltage output module 3, in order to control the switching state of the power switch of power stage circuit 1. Further, control circuit 4 can receive the feedback input signal to generate a feedback output signal, and control the switching state of the power switch of power stage circuit 1 based on the feedback output signal, thereby controlling the energy provided for constant current output module 2 and constant voltage output module 3.

In one example, when constant current output module 2 and constant voltage output module 3 operate simultaneously, control circuit 4 can select the first feedback signal as the feedback input signal. In another example, when constant current output module 2 is in a non-operating state (e.g., disabled), and constant voltage output module 3 is in an operating state, control circuit 4 can select the second feedback signal as the feedback input signal, in order to control an input voltage of constant voltage output module 3 to be not less than a set value, and to ensure the stability of the output voltage of constant voltage output module 3.

In one example, when constant current output module 2 and constant voltage output module 3 operate simultaneously, control circuit 4 can select the minimum value of the first feedback signal and the second feedback signal as the feedback input signal. This can avoid the situation that the input voltage of constant voltage output module 3 is too low at the unsteady state (e.g., switching the operation state of constant current output module 2 and constant voltage output module 3, or switching the load), thereby ensuring that constant voltage output module 3 can operate normally.

Figure 5:
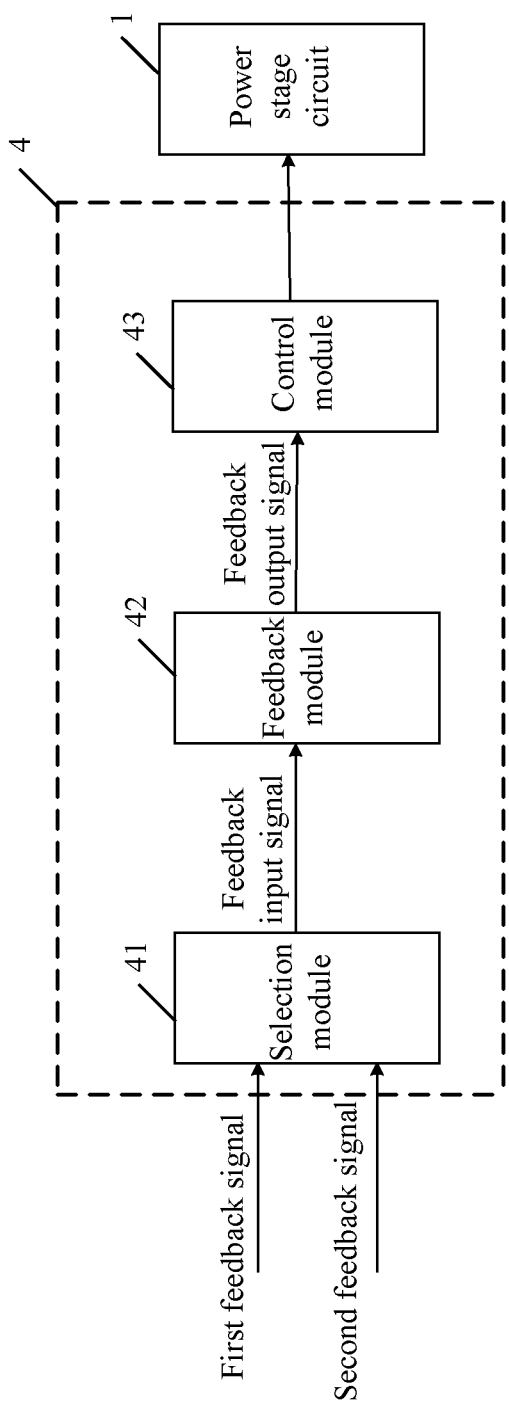
FIG. 5 is a schematic block diagram of a first example control circuit, in accordance with embodiments of the present invention.

Referring now to FIG. 5, shown is a schematic block diagram of a first example control circuit, in accordance with embodiments of the present invention. This example control circuit 4 can include selection module 41, feedback module 42, and control module 43. Selection module 41 can select one of a first feedback signal representative of the output information of constant current output module 2 and a second feedback signal representative of the output information of constant voltage output module 3 as a feedback input signal, based on the operation states of constant current output module 2 and constant voltage output module 3. Feedback module 42 can receive the feedback input signal to generate a feedback output signal. Control module 43 can control the switching state of the power switch of power stage circuit 1 based on the feedback output signal, in order to regulate input signals of constant current output module 2 and constant voltage output module 3.

In one example, power stage circuit 1 can include a power stage circuit including a transformer with at least two secondary windings. For example, the two secondary windings can be wound on the same magnetic core. The two secondary windings can respectively wound on different magnetic cores. Constant voltage output module 3 can be coupled to a first secondary winding, and can include a DC-DC converter that may receive an input voltage to generate a constant output voltage. Constant current output module 2 can be coupled to a second secondary winding, and may include at least one current branch that can include a load and a current control circuit coupled in series. The current control circuit can control a current flowing through a corresponding load to be constant. When constant current output module 2 includes N current branches, the N current branches can be connected in parallel, where $N \geq 2$.

In one example, power stage circuit 1 can include a power stage circuit including a center-tapped transformer. Constant voltage output module 3 can be coupled to one of a high potential and a center-tapped terminals of the center-tapped transformer, and can include a DC-DC converter that may receive an input voltage to generate a constant output voltage. The constant current output module can be coupled to the other of the high potential and the center-tapped terminals of the center-tapped transformer, and may include at least one current branch that can include a load and a current control circuit coupled in series. The current control circuit can control a current flowing through a corresponding load to be constant. When constant current output module 2 includes N current branches, the N current branches can be connected in parallel, where $N \geq 2$.

In addition, the first feedback signal may be a maximum value of voltage drops across the loads, and the second feedback signal may be a sampling signal representative of the input voltage of the constant voltage output module. Further, the first feedback signal may be a minimum value of voltages at low potential terminals of the loads, and the second feedback signal may be the sampling signal representative of the input voltage of the constant voltage output module. In this example, the number of turns N1 of the secondary winding corresponding to constant current output module 2 and the number of turns N2 of the secondary winding corresponding to constant voltage output module 3 may be set to meet a predetermined relationship. In this way, constant voltage output module 3 can operate normally when constant current output module 2 operates at light load, and when constant current output module 2 is disabled.

In particular embodiments, the control circuit can select one of the first feedback signal representative of the output information of the constant current output module and the second feedback signal representative of the output information of the constant voltage output module as the feedback input signal based on the operation states of the constant current output module and the constant voltage output module, thereby controlling the switching state of the power switch of the power stage circuit based on the feedback output signal to provide energy for the constant current output module and the constant voltage output module. When the constant current output module and the constant voltage output module operate simultaneously, the control circuit selects the first feedback signal or the minimum value of the first feedback signal and the second feedback signal as the feedback input signal. When the constant voltage output module is operating, and the constant current output module is disabled, the control circuit can select the second feedback signal as the feedback input signal. This example method can select only one feedback input signal to control the power stage circuit under certain operating condition, and simplify the circuit, thereby reducing the number of the components and the cost, improving the stability and of the system, and solving the problem of energy loss under the condition of light load.

In FIG. 4, the example power converter can include power stage circuit 1, constant current output module 2, constant voltage output module 3 and control circuit 4. Power stage circuit 1 can provide energy to constant current output module 2 and constant voltage output module 3. Control circuit 4 can select one of a first feedback signal representative of the output information of constant current output module 2 and a second feedback signal representative of the output information of constant voltage output module 3 as a feedback input signal, based on the operation states of constant current output module 2 and constant voltage output module 3, in order to control the switching state of the power switch of power stage circuit 1. Further, control circuit 4 can receive the feedback input signal to generate a feedback output signal, and control the switching state of the power switch of power stage circuit 1 based on the feedback output signal, thereby controlling the energy provided for constant current output module 2 and constant voltage output module 3.

Figure 6:
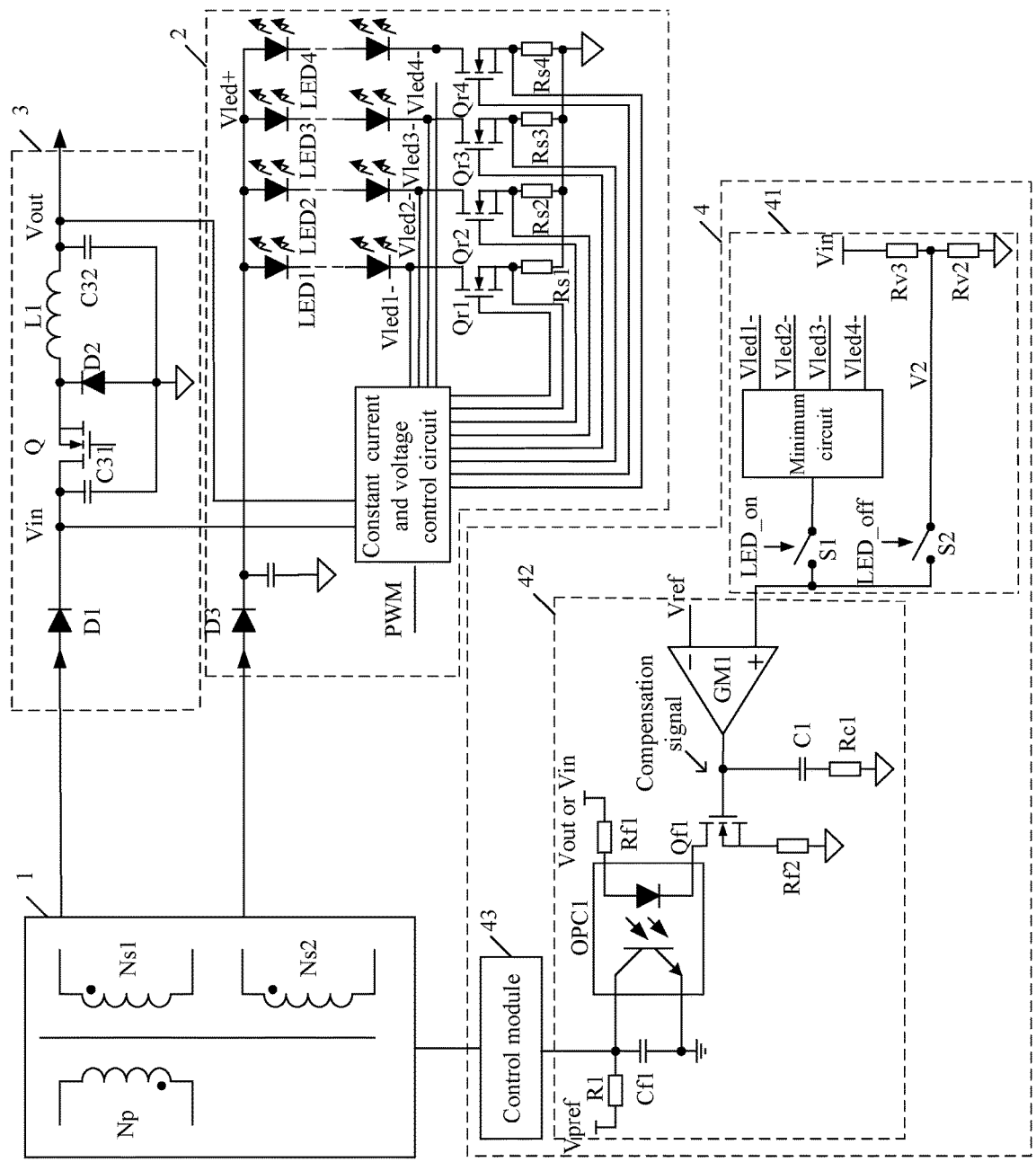
FIG. 6 is a schematic block diagram of a second example power converter with a control circuit, in accordance with embodiments of the present invention.

Referring now to FIG. 6, shown is a schematic block diagram of a second example power converter with a control circuit, in accordance with embodiments of the present invention. This example power converter can include power stage circuit 1, constant current output module 2, constant voltage output module 3 and control circuit 4. Power stage circuit 1 can be configured as a flyback power stage circuit including two secondary windings. Constant voltage output module 3 can connect to secondary winding Ns1, and constant voltage output module 3 can connect to secondary winding Ns2. Constant current output module 2 can include four current branches connected in parallel with each other, and each of the current branches can include a load and a current control circuit connected in series, and the current control circuit can control a current flowing through the corresponding load to be constant. Here, the load may be a light-emitting diode (LED), or an LED string including multiple LEDs connected in series. Constant voltage output module 3 can include a DC-DC converter which can convert input voltage Vin into constant output voltage Vout. In one example, the DC-DC converter can be configured as a buck converter, and the buck converter can adopt control methods such as peak current control, valley current control and so on, which is not limited in the present invention. In another example, the DC-DC converter may be other converters such as a boost converter, which is not limited in the present invention. This example power converter can further include a constant current and voltage control circuit, which can control the current control circuits in constant current output module 2 and the DC-DC converter in constant voltage output module 3 based on a pulse-width modulation (PWM) signal.

In one example, control circuit 4 can include selection module 41, feedback module 42, and control module 43. Selection module 41 can select one of a first feedback signal representative of the output information of constant current output module 2 and a second feedback signal representative of the output information of constant voltage output module 3 as a feedback input signal, based on the operation states of constant current output module 2 and constant voltage output module 3. Further, the first feedback signal can be configured as the minimum value of voltages at low potential terminals of the loads (e.g., voltages Vled1-, Vled2-, Vled3-, Vled4-), and the second feedback signal can be configured as sampling signal V2 that is generated by dividing input voltage Vin sensed at an input terminal of constant voltage output module 3. Control module 43 can control the switching state of the power switch of power stage circuit 1 based on the feedback output signal, in order to regulate input signals of constant current output module 2 and constant voltage output module 3.

In one example, selection module 41 can include switch S1, switch S2, and a minimum circuit. The minimum circuit can receive the voltages at the low potential terminals of the loads, and generate the minimum value of voltages at low potential terminals of the loads. An output terminal of the minimum value circuit can connect to an output terminal of selection module 41 via switch S1. One terminal of switch S2 can receive sampling signal V2, and the other terminal of switch S2 can connect to the output terminal of selection module 41. Selection module 41 can generate an feedback output signal based on the feedback input signal at the output terminal thereof. In this example, a voltage divide can include resistors Rv3 and Rv2 connected in series between input voltage Vin and the ground, and can divide input voltage Vin to generate sampling signal V2 at a common terminal of resistors Rv3 and Rv2.

Further, signals LED_on and LED_off can be generated based on the operation states of constant current output module 2 and constant voltage output module 3. When constant current output module 2 and constant voltage output module 3 operate simultaneously, signal LED_on can be active, and signal LED_off can be inactive, such that switch S1 controlled by signal LED_on can be turned on, and switch S2 controlled by signal LED_off can be turned off. In this way, control circuit 4 can select the first feedback signal that is the minimum value of voltages at low potential terminals of the loads as the feedback input signal. In another example, when constant current output module 2 is in a non-operating state, and constant output module 3 is in an operating state, signal LED_off can be active, and signal LED_on can be inactive, such that switch S1 controlled by signal LED_on can be turned off, and switch S2 controlled by signal LED_off can be turned on. In this way, control circuit 4 can select the second feedback signal that is sampling signal V2 as the feedback input signal.

In one example, feedback module 42 can include optocoupler OPC1. Feedback module 42 can generate a compensation signal according to the feedback input signal, and convert the compensation signal into the feedback output signal via optocoupler OPC1. Feedback module 42 can further include transconductance operational amplifier GM1 and capacitor C1. A non-inverting input terminal of transconductance operational amplifier GM1 can receive the feedback input signal, and an inverting input terminal of transconductance operational amplifier GM1 can receive reference voltage Vref. An output terminal of transconductance operational amplifier GM1 can connect to one terminal of capacitor C1, and the other terminal of capacitor C1 can be grounded via resistor Rc1. The compensation signal that is generated at the output terminal of transconductance operational amplifier GM1 can control a primary side current of optocoupler OPC1, thereby controlling a secondary side current of optocoupler OPC1 to generate the feedback output signal. In addition, the change tendency of the feedback output signal can be consistent with the change tendency of the compensation signal.

Feedback module 42 can also include transistor Qf1 and resistor R1. A control terminal of transistor Qf1 can connect to the output terminal of transconductance operational amplifier GM1. The primary side of optocoupler OPC1 and transistor Qf1 are connected in series between a first supply voltage and ground, resistor R1 and the secondary side of optocoupler OPC1 are connected in series between a second supply voltage and ground, and the feedback output signal can be generated at the common terminal of resistor R1 and the secondary side of optocoupler OPC1. Here, the first supply voltage can be configured as input voltage Vin of the constant voltage output module or output voltage Vout of the constant voltage output module, and the second supply voltage can be configured as set voltage Vpref. Control circuit 4 can further include resistor Rf1 connected to the first supply voltage, resistor Rf2 connected in series with transistor Qf1 for limiting the current, and capacitor Cf1 connected between the common terminal of resistor R1 and the secondary side of optocoupler OPC1 and ground.

Figure 7:
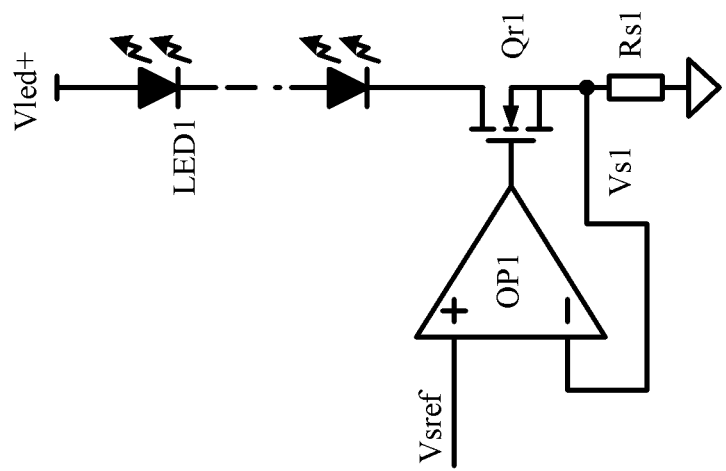
FIG. 7 is a schematic block diagram of an example current control circuit, in accordance with embodiments of the present invention.

Referring now to FIG. 7, shown is a schematic block diagram of an example current control circuit, in accordance with embodiments of the present invention. Constant current output module 2 can include four current branches connected in parallel with each other, and each of the current branches can include an LED string and a current control circuit connected in series. The control circuit can control the current flowing through the corresponding LED string to be constant. In this example, taking LED string LED1 as an example, the current control circuit can include transistor Qr1, resistor Rs1 and operational amplifier OP1. LED string LED1, transistor Qr1, and resistor Rs1 can connect in series between input voltage Vled+ of constant current output module 2 and the ground. A first input terminal of operational amplifier OP1 can connect to a common terminal of transistor Qr1 and resistor Rs1, a second input terminal of operational amplifier OP1 can receive reference voltage Vsref, and an output terminal of operational amplifier OP1 can connect the control terminal of transistor Qr1. It should be understood that the current control circuit can alternatively be implemented in other ways, which can control the current flowing through the corresponding LED string to be constant.

Figure 8:
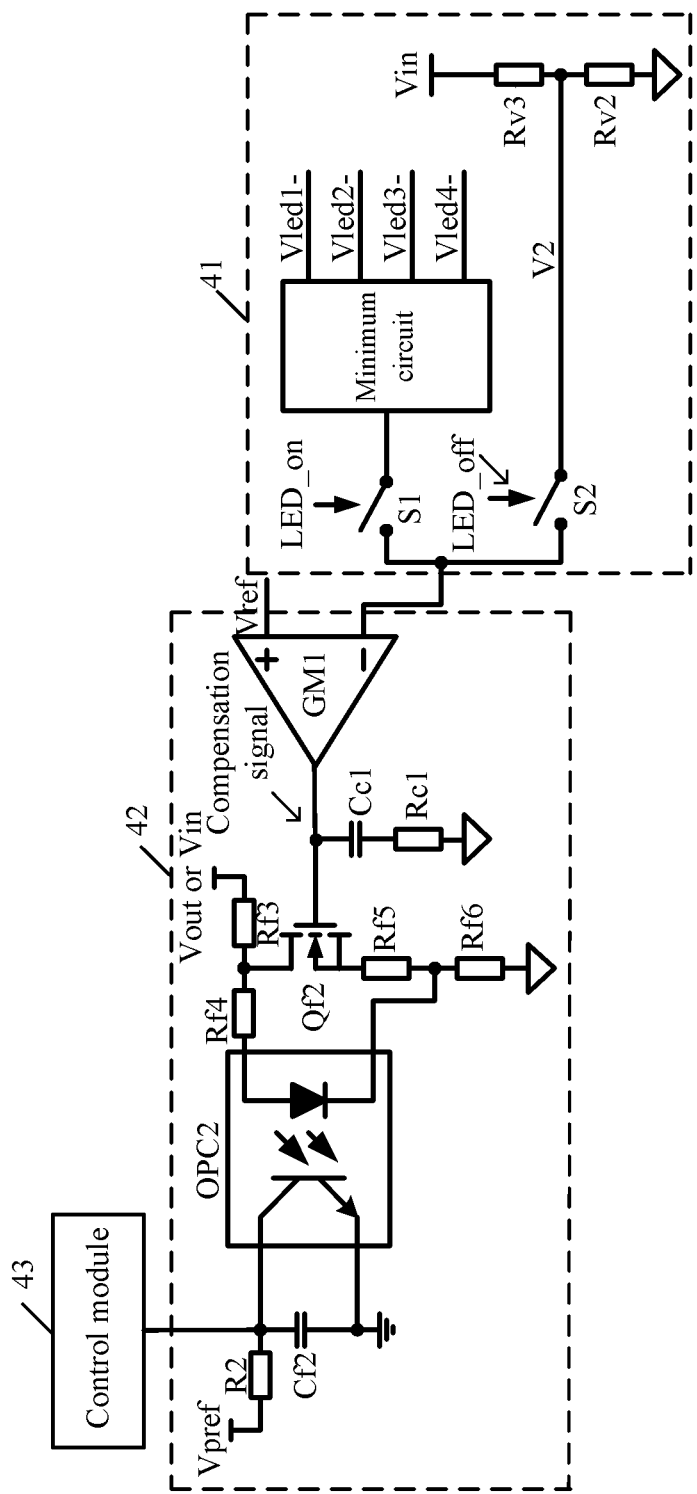
FIG. 8 is a schematic block diagram of a second example control circuit, in accordance with embodiments of the present invention.

Referring now to FIG. 8, shown is a schematic block diagram of a second example control circuit, in accordance with embodiments of the present invention. With respect to FIG. 6, the difference here is the structure of the feedback module. This example feedback module 42 can include optocoupler OPC2. Feedback module 42 can generate a compensation signal according to the feedback input signal, and convert the compensation signal into the feedback output signal via optocoupler OPC2. Feedback module 42 can also include transconductance operational amplifier GM1 and capacitor C1. An inverting input terminal of transconductance operational amplifier GM1 can receive the feedback input signal, and a non-inverting input terminal of transconductance operational amplifier GM1 can receive reference voltage Vref. An output terminal of transconductance operational amplifier GM1 can connect to one terminal of capacitor C1, and the other terminal of capacitor C1 can be grounded via resistor Rc1. The compensation signal that is generated at the output terminal of transconductance operational amplifier GM1 can control a primary side current of optocoupler OPC2, thereby controlling a secondary side current of optocoupler OPC2 to generate the feedback output signal.

In addition, the change tendency of the feedback output signal can be opposite to the change tendency of the compensation signal. Feedback module 42 can also include transistor Qf2 and resistor R2. A control terminal of transistor Qf2 can connect to the output terminal of transconductance operational amplifier GM1. The primary side of optocoupler OPC2 and transistor Qf2 can connect in parallel between a first supply voltage and ground, resistor R2 and the secondary side of optocoupler OPC2 may be connected in series between a second supply voltage and ground, and the feedback output signal can be generated at the common terminal of resistor R2 and the secondary side of optocoupler OPC2. Here, the first supply voltage can be configured as input voltage Vin of the constant voltage output module or output voltage Vout of the constant voltage output module, and the second supply voltage can be configured as set voltage Vpref. Control circuit 4 can also include resistor Rf3 connected to the first supply voltage, resistor Rf4 connected in series with resistors Rf3, Rf5, and Rf6 connected in series with transistor Qf2 for limiting the current, and capacitor Cf2 connected between the common terminal of resistor R2 and the secondary side of optocoupler OPC2 and ground.

Figure 9:
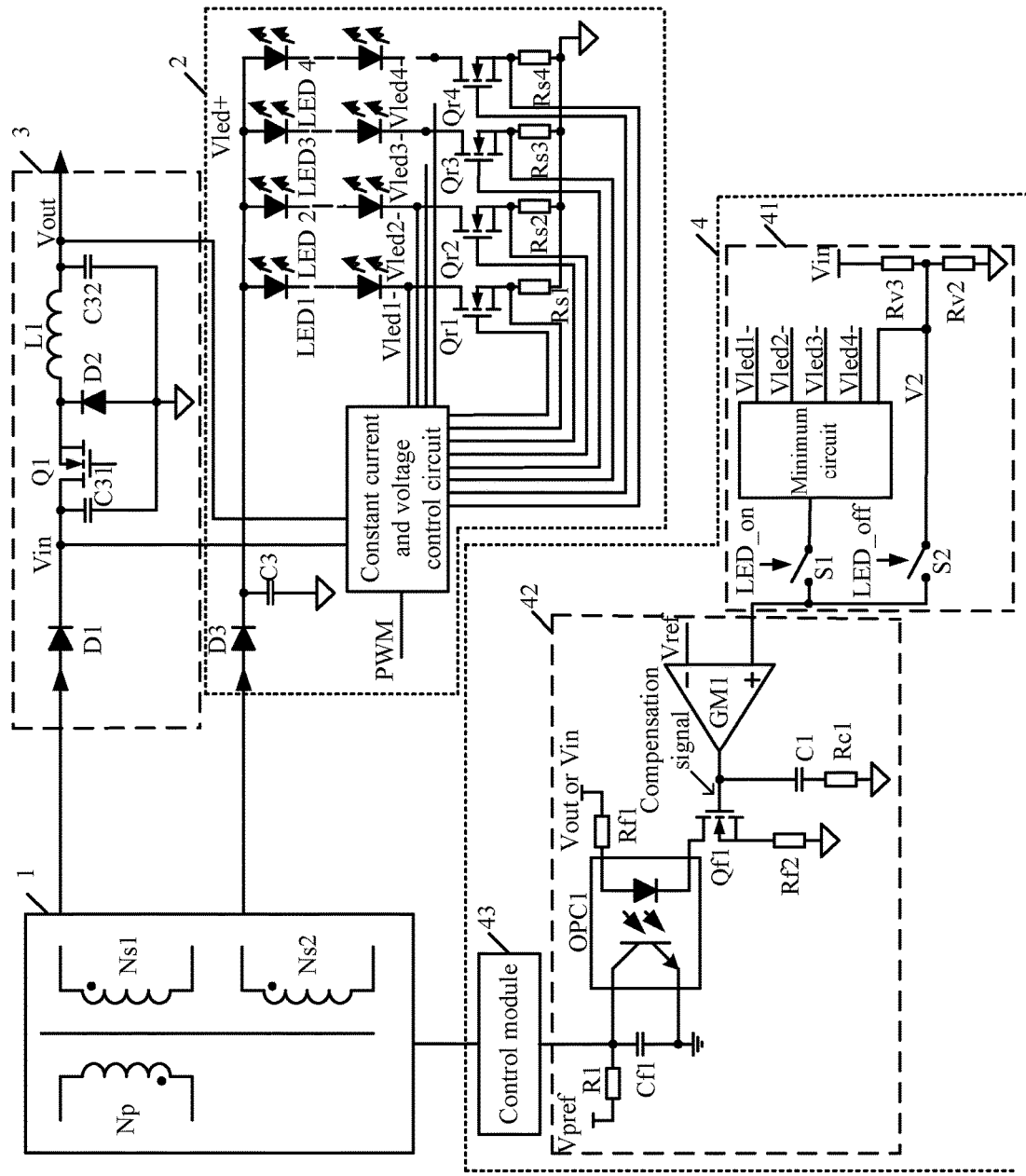
FIG. 9 is a schematic block diagram of a third example control circuit, in accordance with embodiments of the present invention.

Referring now to FIG. 9, shown is a schematic block diagram of a third example control circuit, in accordance with embodiments of the present invention. With respect to FIG. 6, the difference here is the structure of the selection module. This example selection module 41 can include switches S1 and S2, and a minimum circuit. The minimum circuit can receive the voltages at the low potential terminals of the loads and sampling signal V2 representative of an input voltage of the constant voltage output module, and generate the minimum value of voltages at low potential terminals of the loads and sampling signal V2. An output terminal of the minimum circuit can connect to an output terminal of selection module 41 via switch S1. One terminal of switch S2 can receive sampling signal V2, and the other terminal of switch S2 can connect to the output terminal of selection module 41. Selection module 41 can generate an feedback output signal based on the feedback input signal at the output terminal.

Further, signals LED_on and LED_off can be generated based on the operation states of the constant current output module 2 and constant voltage output module 3. When constant current output module 2 and constant voltage output module 3 operate simultaneously, signal LED_on can be active, and signal LED_off can be inactive, such that switch S1 controlled by signal LED_on can be turned on, and switch S2 controlled by signal LED_off can be turned off. In this way, control circuit 4 can select the first feedback signal that is the minimum value of voltages at low potential terminals of the loads and sampling signal V2 as the feedback input signal. In another example, when constant current output module 2 is in a non-operating state, and constant voltage output module 3 is in an operating state, signal LED_off can be active, and signal LED_on can be inactive, such that switch S1 controlled by signal LED_on can be turned off, and switch S2 controlled by signal LED_off can be turned on. In this way, control circuit 4 can select the second feedback signal that is sampling signal V2 as the feedback input signal. This can avoid the situation that the input voltage of constant output module 3 is too low at the unsteady state (e.g., switching the operation state of constant current output module 2 and constant voltage output module 3, or switching the load), thereby ensuring that constant voltage output module 3 can operate normally.

Figure 10:
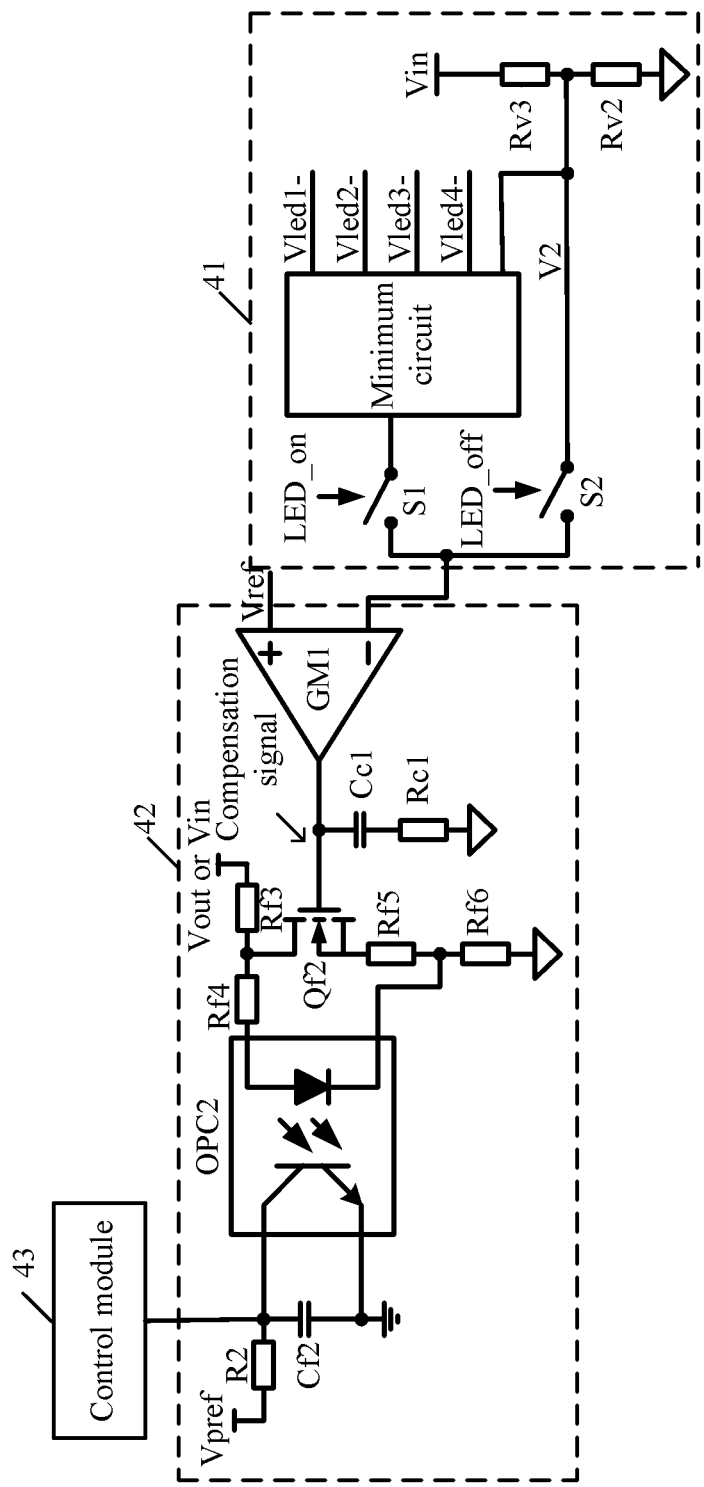
FIG. 10 is a schematic block diagram of a fourth example control circuit, in accordance with embodiments of the present invention.

Referring now to FIG. 10, shown is a schematic block diagram of a fourth example control circuit, in accordance with embodiments of the present invention. With respect to FIG. 9, the difference here is the structure of the feedback module. This example feedback module 42 can include optocoupler OPC2. Feedback module 42 can generate a compensation signal according to the feedback input signal, and convert the compensation signal into the feedback output signal via optocoupler OPC2. Feedback module 42 can also include transconductance operational amplifier GM1 and capacitor C1. An inverting input terminal of transconductance operational amplifier GM1 can receive the feedback input signal, and a non-inverting input terminal of transconductance operational amplifier GM1 can receive reference voltage Vref. An output terminal of transconductance operational amplifier GM1 can connect to one terminal of capacitor C1 and the other terminal of capacitor C1 can be grounded via resistor Rc1. The compensation signal that is generated at the output terminal of transconductance operational amplifier GM1 can control a primary side current of optocoupler OPC2, thereby controlling a secondary side current of optocoupler OPC2 to generate the feedback output signal. In addition, the change tendency of the feedback output signal can be opposite to the change tendency of the compensation signal.

Feedback module 42 can also include transistor Qf2 and resistor R2. A control terminal of transistor Qf2 can connect to the output terminal of transconductance operational amplifier GM1. The primary side of optocoupler OPC2 and transistor Qf2 are connected in parallel between a first supply voltage and ground, resistor R2 and the secondary side of optocoupler OPC2 are connected in series between a second supply voltage and ground, and the feedback output signal can be generated at the common terminal of resistor R2 and the secondary side of optocoupler OPC2. Here, the first supply voltage can be configured as input voltage Vin of the constant voltage output module or output voltage Vout of the constant voltage output module, and the second supply voltage can be configured as set voltage Vpref.

Particular embodiments can also include a control method of controlling a power converter. The power converter can include a constant voltage output module, a constant current output module, and a power stage circuit. The control circuit may select one of a first feedback signal representative of output information of the constant current output module, and a second feedback signal representative of output information of the constant voltage output module as a feedback input signal based on operation states of the constant current output module and the constant voltage output module, in order to control a switching state of a power switch of the power stage circuit.

In one example, when the constant current output module and the constant voltage output module operate simultaneously, the control circuit can select the first feedback signal as the feedback input signal. In one example, when the constant current output module and the constant voltage output module operate simultaneously, the control circuit can select a minimum value of the first feedback signal and the second feedback signal as the feedback input signal. In one example, the power converter may be configured as a flyback converter.

In one example, the power stage circuit include a power stage circuit including a transformer with at least two secondary windings. The constant voltage output module can be coupled to a first secondary winding, and can include a DC-DC converter that may receive an input voltage to generate a constant output voltage. In addition, the constant current output module can be coupled to a second secondary winding, and may include at least one current branch that can include a load and a current control circuit coupled in series. The current control circuit can control a current flowing through a corresponding load to be constant. When constant current output module 2 includes N current branches, the N current branches can be connected in parallel, where N≥2.

In one example, power stage circuit 1 can include a power stage circuit including a center-tapped transformer. Constant voltage output module 3 can be coupled to one of a high potential and a center-tapped terminals of the center-tapped transformer, and may include a DC-DC converter that may receive an input voltage to generate a constant output voltage. The constant current output module can be coupled to the other of the high potential and the center-tapped terminals of the center-tapped transformer, and may include at least one current branch that can include a load and a current control circuit coupled in series. The current control circuit can control a current flowing through a corresponding load to be constant. When constant current output module 2 includes N current branches, the N current branches can be connected in parallel, where N≥2.

For example, the first feedback signal may be a maximum value of voltage drops across the loads, and the second feedback signal may be a sampling signal representative of the input voltage of the constant voltage output module. Further, the first feedback signal may be a minimum value of voltages at low potential terminals of the loads, and the second feedback signal may be the sampling signal representative of the input voltage of the constant voltage output module.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for controlling a power converter, the power converter comprising a constant voltage output module, a constant current output module, and a power stage circuit having a transformer, wherein:
   a) the constant current output comprises a DC-DC converter that is configured to receive a first input voltage generated by a first secondary winding of the transformer to generate a constant output voltage;
   b) the constant current output module comprises at least one current branch that is configured to receive a second input voltage generated by a second secondary winding of the transformer; and
   c) the control circuit is configured to receive a first feedback signal representative of output information of the constant current output module, and a second feedback signal representative of output information of the constant voltage output module and generate a feedback output signal, in order to control a switching state of a power switch of the power stage circuit.

2. The control circuit of claim 1, wherein the control circuit is configured to select one of the first feedback signal and the second feedback signal as a feedback input signal based on operation states of the constant voltage output module and the constant current output module.

3. The control circuit of claim 2, wherein when the constant current output module and the constant voltage output module operate simultaneously, the control circuit selects the first feedback signal as the feedback input signal.

4. The control circuit of claim 2, wherein when the constant current output module and the constant voltage output module operate simultaneously, the control circuit selects a minimum value of the first and second feedback signals as the feedback input signal.

5. The control circuit of claim 2, wherein when the constant voltage output module operates, and the constant current output module is disabled, the control circuit selects the second feedback signal as the feedback input signal.

6. The control circuit of claim 1, wherein the control circuit is configured to receive the first input voltage and voltage drops across the loads of the constant current output module.

7. The control circuit of claim 1, wherein the control circuit comprises:
a) a selection module configured to select one of the first feedback signal and the second feedback signal as the feedback input signal based on the operation states of the constant current output module and the constant voltage output module;
b) a feedback module configured to receive the feedback input signal to generate the feedback output signal; and
c) a control module configured to control the switching state of the power switch based on the feedback output signal, in order to regulate input signals of the constant current output module and the constant voltage output module.

8. The control circuit of claim 7, wherein the selection module comprises:
a) a minimum circuit having an output terminal coupled to an output terminal of the selection module via a first switch, and being configured to receive voltages at low potential terminals of loads of the constant current output module, or to receive voltages at low potential terminals of loads of the constant current output module and a sampling signal representative of the first input voltage of the constant voltage output module; and
b) a second switch having a first terminal for receiving the sampling signal, and a second terminal coupled to the output terminal of the selection module.

9. The control circuit of claim 8, wherein:
a) when the constant current output module and the constant voltage output module operate simultaneously, the first switch is turned on, and the second switch is turned off; and
b) when the constant voltage output module operates, and the constant current output module is disabled, the first switch is turned off, and the second switch is turned on.

10. The control circuit of claim 7, wherein the feedback module is configured to generate a compensation signal based on the feedback input signal, and to generate the feedback output signal base on the compensation signal.

11. The control circuit of claim 10, wherein the change tendency of the feedback output signal is consistent with the change tendency of the compensation signal.

12. The control circuit of claim 10, wherein the change tendency of the feedback output signal is opposite to the change tendency of the compensation signal.

13. The control circuit of claim 10, wherein the feedback module further comprises:
a) a transconductance operational amplifier having a first input terminal for receiving the feedback input signal, a second input terminal for receiving a reference voltage, and being configured to generate the compensation signal at an output terminal thereof;
b) a first capacitor coupled to the output terminal of the transconductance operational amplifier; and
c) an optocoupler having a primary side current that is controlled based on the compensation signal, thereby controlling a secondary side current of the optocoupler to generate the feedback output signal.

14. The control circuit of claim 13, wherein the feedback module further comprises:
a) a first transistor having a control terminal coupled to the output terminal of the transconductance operational amplifier, and being coupled in series with a primary side of the optocoupler between a first supply voltage and a ground reference;
b) a first resistor coupled in series with a secondary side of the optocoupler between a second supply voltage and a ground reference; and
c) wherein the feedback output signal is generated at a common terminal of the first resistor and the secondary side of the optocoupler.

15. The control circuit of claim 13, wherein the feedback module further comprises:
a) a first transistor having a control terminal coupled to the output terminal of the transconductance operational amplifier, and being coupled in parallel with a primary side of the optocoupler between a first supply voltage and a ground reference;
b) a first resistor coupled in series with a secondary side of the optocoupler between a second supply voltage and a ground reference; and
c) wherein the feedback output signal is generated at a common terminal of the first resistor and the secondary side of the optocoupler.

16. The control circuit of claim 1, wherein the constant current output module comprises N current branches coupled in parallel with each other, each of the N current branches comprises a load and a current control circuit coupled in series, and the current control circuit is configured to control a current flowing through a corresponding load to be constant, wherein N is a positive integer.

17. The control circuit of claim 1, wherein the first feedback signal is configured to be a maximum value of voltage drops across the loads of the constant current output module, and the second feedback signal is configured to be a sampling signal representative of the first input voltage of the constant voltage output module.

18. The control circuit of claim 1, wherein the first feedback signal is configured to be a minimum value of voltages at low potential terminals of the loads of the constant current output module, second feedback signal is configured to be a sampling signal representative of the first input voltage of the constant voltage output module.

19. A power converter, comprising the control circuit of the claim 1, wherein:

a) the constant voltage output module is configured to generate the constant output voltage;
b) the constant current output module is configured to provide a constant current for a load; and
c) the power stage circuit is configured to provide energy for the constant voltage output module and the constant voltage output module.

20. The power converter of the claim 19, wherein the power converter is configured as a flyback converter.

* * * * *